United States Patent
Pike et al.

(10) Patent No.: US 10,913,336 B2
(45) Date of Patent: Feb. 9, 2021

(54) METHOD FOR PRODUCING A VEHICLE ROOF, MODULAR ROOF FOR A VEHICLE ROOF, AND VEHICLE ROOF FOR A MOTOR VEHICLE

(71) Applicant: WEBASTO SE, Stockdorf (DE)

(72) Inventors: Matthew Pike, Stockdorf (DE); Michael Schönberger, Stockdorf (DE); Josef Haas, Stockdorf (DE); Florian Burkhardt, Stockdorf (DE); Philipp Hüttel, Stockdorf (DE); Robert Bertsch, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 77 days.

(21) Appl. No.: 16/316,929

(22) PCT Filed: Jul. 12, 2017

(86) PCT No.: PCT/EP2017/067569
§ 371 (c)(1),
(2) Date: Jan. 10, 2019

(87) PCT Pub. No.: WO2018/011274
PCT Pub. Date: Jan. 18, 2018

(65) Prior Publication Data
US 2019/0291548 A1 Sep. 26, 2019

(30) Foreign Application Priority Data
Jul. 14, 2016 (DE) .......................... 10 2016 112 960

(51) Int. Cl.
*B60J 7/043* (2006.01)
*B62D 25/06* (2006.01)
(Continued)

(52) U.S. Cl.
CPC ............... *B60J 7/043* (2013.01); *B60J 7/022* (2013.01); *B62D 25/06* (2013.01); *B62D 65/06* (2013.01); *B62D 29/002* (2013.01)

(58) Field of Classification Search
CPC ................................ B60J 7/022; B60J 7/043
(Continued)

(56) References Cited

U.S. PATENT DOCUMENTS 5,154,482 A * 10/1992 Hayashi ................. B60J 7/0435
296/216.03
6,830,290 B2 12/2004 De Gaillard
(Continued)

FOREIGN PATENT DOCUMENTS

CN 104553698 A 4/2015
DE 19808599 C1 7/1999
(Continued)

OTHER PUBLICATIONS

International Search Report for PCT/EP2017/067569 dated Nov. 10, 2017 and English translation submitted herewith (7 Pages).
(Continued)

*Primary Examiner* — Dennis H Pedder
(74) *Attorney, Agent, or Firm* — Fitch, Even, Tabin & Flannery, LLP

(57) ABSTRACT

A method for producing a vehicle roof for a motor vehicle may have the steps of providing of a first roof module with a frame element and of a second roof module which is frameless with respect to the first roof module. The method may further provide the step of foaming of an edge of the second roof module at a predefined position, and coupling of a rear (in relation to a longitudinal axis (L) of the vehicle roof) section of the frame element of the first roof module to the foamed edge of the second roof module, and configuring of a modular roof as a result.

10 Claims, 7 Drawing Sheets

Figure 1:
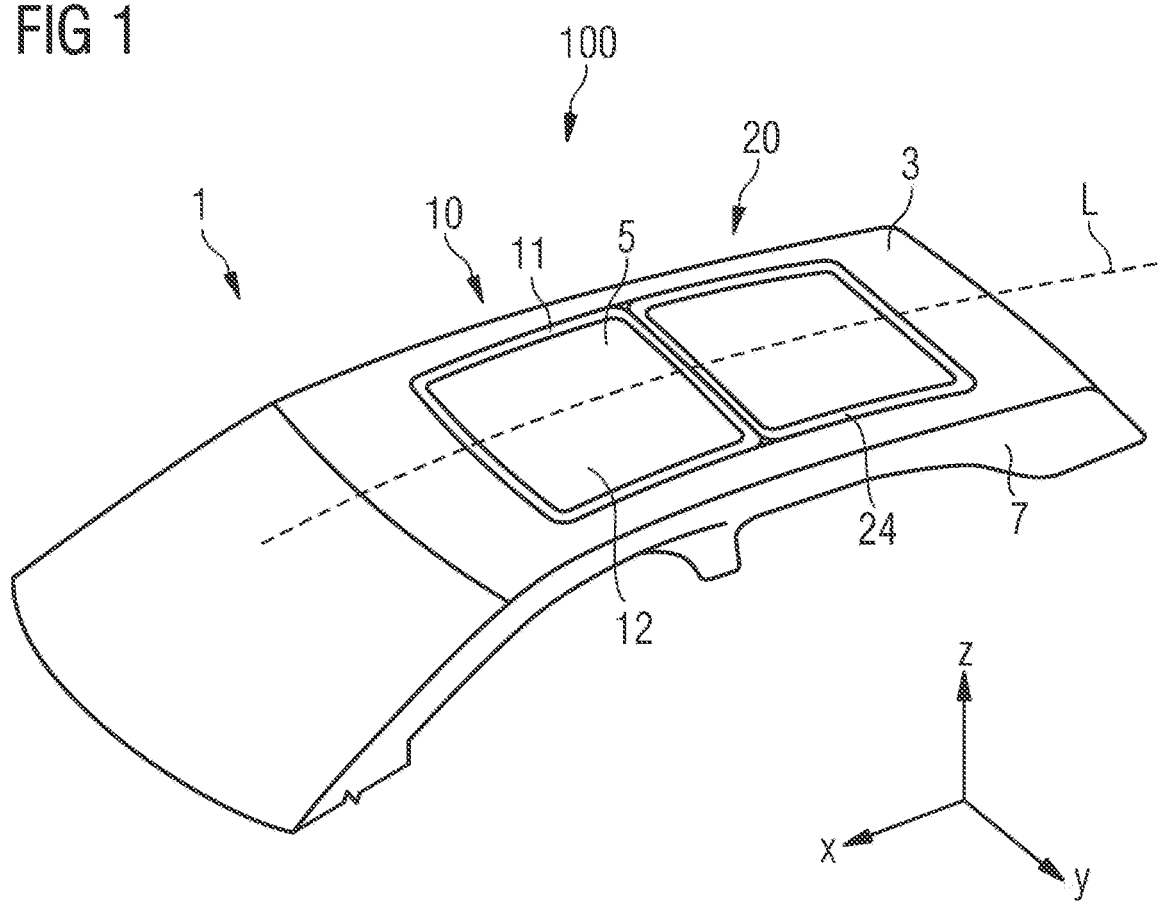

(51) Int. Cl.
*B62D 65/06* (2006.01)
*B60J 7/02* (2006.01)
*B62D 29/00* (2006.01)

(58) Field of Classification Search
USPC .............. 296/216.02–216.05, 216.06, 216.09
See application file for complete search history.

(56) References Cited

U.S. PATENT DOCUMENTS

| | | |
|---|---|---|
| 2007/0275216 A1 | 11/2007 | Grimm et al. |
| 2009/0026808 A1 | 1/2009 | Seemann et al. |
| 2010/0066130 A1 | 3/2010 | Rashidy et al. |
| 2015/0028630 A1 | 1/2015 | Grimm et al. |

FOREIGN PATENT DOCUMENTS

| | | |
|---|---|---|
| DE | 10212241 A1 | 10/2003 |
| DE | 102007012486 A1 | 9/2008 |
| DE | 102012023098 A1 | 5/2014 |
| DE | 102013108081 A1 | 1/2015 |
| EP | 1859931 A1 | 11/2007 |
| EP | 2020367 A2 | 2/2009 |

OTHER PUBLICATIONS

EPO Search/Examination Report for corresponding European Patent Application No. 17 737 816.3, dated Apr. 21, 2020 with English translation (6 pages).

\* cited by examiner

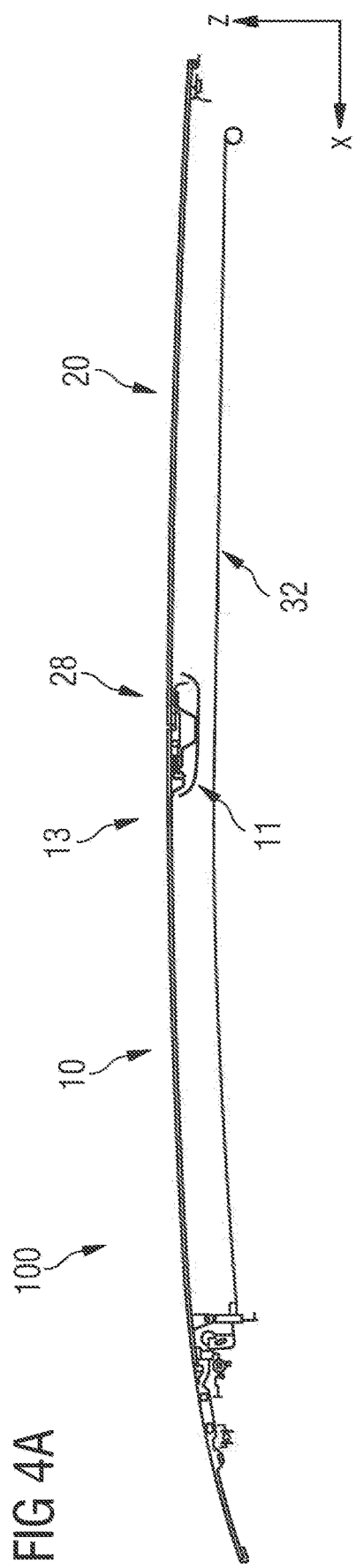
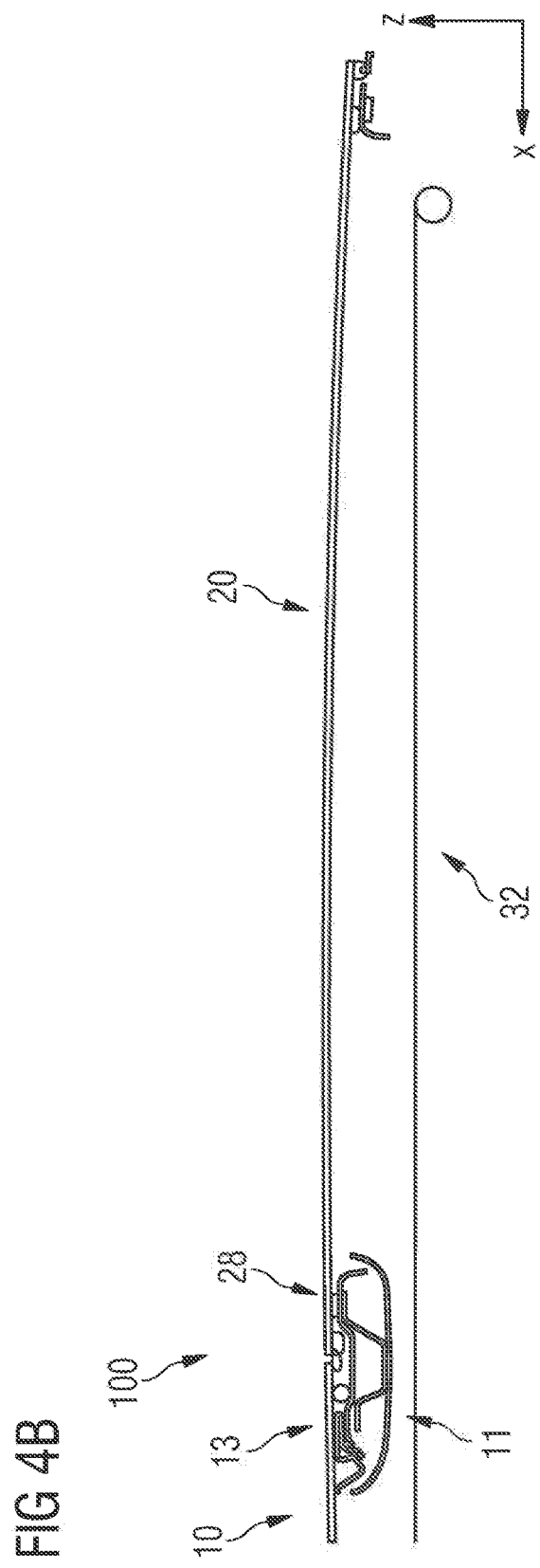

METHOD FOR PRODUCING A VEHICLE ROOF, MODULAR ROOF FOR A VEHICLE ROOF, AND VEHICLE ROOF FOR A MOTOR VEHICLE

CROSS-REFERENCE TO RELATED APPLICATIONS

This application is a U.S. national phase application filed under 35 U.S.C. § 371 of International Application No. PCT/EP2017/067569, filed Jul. 12, 2017, designating the United States, which claims priority from German Patent Application No. 10 2016 112 960.7, filed Jul. 14, 2016, which are hereby incorporated herein by reference in their entirety for all purposes.

FIELD

Some motor vehicles have vehicle roofs with one or more tops which, for example as fixedly integrated glass elements, permit a view through the vehicle roof, or are movably configured components, in order to selectively make opening and closure of an opening in the vehicle roof possible. During production of a vehicle roof of this type with a plurality of roof modules, the roof modules are connected to a vehicle body of the motor vehicle, for example, by means of a common frame. A configuration of this type of a vehicle roof is described, for example, in document EP 2020367 A2.

BACKGROUND

It is an object of the invention to provide a method for producing a vehicle roof and a modular roof for a vehicle roof, which enable a material-saving and inexpensive construction of a vehicle roof with a flat design.

The object is achieved by way of the features of the independent patent claims. Advantageous embodiments are specified in the subclaims.

SUMMARY

A method according to the invention for producing a vehicle roof for a motor vehicle comprises providing of a first roof module with a frame element and a roof element which is coupled to the frame element in such a way that the roof element can be moved relative to the frame element. Furthermore, the method comprises providing of a frameless second roof module which is separate from the first roof module. Furthermore, the method comprises foaming of an edge of the second roof module at a predefined position, and coupling of the second roof module to the first roof module and configuring of a modular roof as a result. Here, a rear in relation to a longitudinal axis of the vehicle roof which is to be produced section of the frame element of the first roof module is coupled to the foamed front edge of the second roof module.

The above-described method makes a material-saving and inexpensive construction of a vehicle roof possible, and contributes to producing a space-saving construction for the vehicle roof due to the described coupling of the roof modules.

The frame element is realized, in particular, as a load-bearing coupling element for the first roof module, in order for it to be possible for said first roof module to be attached to a vehicle body of the motor vehicle. The frame element of the first roof module is realized, for example, as a metal frame, in particular a steel frame, which surrounds the roof element of the first roof module over the full circumference. Moreover, the rear section of the frame element configures an interface for coupling to the second roof module.

In contrast to the first roof module, the second roof module does not have a frame element of this type, and is accordingly configured as a frameless roof module. Therefore, the two roof modules do not have a common frame which couples the roof modules to one another. In relation to the longitudinal axis of the vehicle roof which is to be produced and a customary driving direction of an associated motor vehicle which is ready for operation, the two coupled roof modules are arranged behind one another in the modular roof which is configured. The first roof module can therefore also be called the front roof module, and the second roof module can be called the rear roof module. As a consequence, in particular, the modular roof is configured in such a way that a rear edge of the frame element of the front roof module is coupled to a front foamed edge of the rear roof module.

Here, the foamed portion which is configured can realize a separate foamed portion on the front edge of the second roof module or else can be configured over the full circumference and can configure a type of plastic frame on the side edge of the second roof module. A foamed frame of this type is to be differentiated from the frame element of the first roof module with regard to function and properties, however. A foamed portion which is configured laterally on the second roof module can configure a receiving possibility for guide elements, such as guide rails, and can make an attachment of the second roof module to a vehicle body of the motor vehicle possible, in particular.

At their coupling interface (realized by way of the rear section of the frame element and the front foamed section of the second roof module), in particular, the two roof modules are adapted to one another in such a way that the front and rear roof module can be coupled securely and reliably and, in the modular roof which is configured, realize a flush transition of adjoining surfaces and edges. Therefore, as a preliminary stage, the modular roof represents a prefabricated structural unit for a vehicle roof which is ready for operation and is realized by virtue of the fact that the modular roof which is configured is coupled to a vehicle body of a motor vehicle which is provided for this purpose.

The foamed portion on the second roof module is adapted, in particular, to the frame element of the first roof module and is of more elongate configuration, for example, in relation to the longitudinal axis than is the case in a customary configuration of a foamed roof module, in order to realize an increased bearing area with the frame element to be coupled and in order to contribute to a stable and secure connection of the two roof modules in the modular roof. Moreover, the foamed portion or a further foamed portion on the sides and/or on a rear edge of the second roof module can be adapted to a depth of the first roof module including the frame element, in order to configure a flush and esthetically pleasing final result of the vehicle roof in the case of a configuration of the modular roof and an attachment to a vehicle body of the motor vehicle. In this context, the depth relates substantially to a vertical direction of extent of the respective components, which depth is oriented perpendicularly with respect to the vehicle roof which is attached to a vehicle body of the motor vehicle.

The modular roof and the corresponding vehicle roof can be realized in a simple and inexpensive way by means of the method which is described. For example, no expensive tooling is required, as is usually the case if a common frame element for the two roof modules is manufactured, the shape of which is similar to a number eight in relation to a plan view. By virtue of the fact that merely the front roof module has a frame element, for example in a configuration of a steel frame, a significant material saving is achieved, moreover, which has a further advantageous effect on the costs for producing the modular roof and the vehicle roof. If, for example, a common, single-piece frame for two roof modules is configured from a plate-shaped raw material, the material of the frame which is removed from the raw material for the cutouts of the respective roof elements is waste which is avoided by means of the method which is described.

Moreover, the method which is described makes a space-saving construction of the vehicle roof possible on account of the coupling between the first roof module with a frame element and the second frameless roof module. Since a frame element for the second roof module is dispensed with, the modular roof and the corresponding vehicle roof can be of flat configuration, in particular in relation to a depth of the second roof module, and can therefore contribute to an increased headroom in a passenger compartment of the motor vehicle.

Furthermore, the method which is described and that construction of the modular roof which can be configured by way of it make an advantageous variability for configuring the vehicle roof possible. It is not necessary to configure a complete frame and to adapt it to a vehicle body of a motor vehicle which is provided for this purpose, but rather merely a simple adaptation of the second roof module or the foamed portion which is configured on the second roof module to predefined vehicle body properties of the motor vehicle is required. A simple adaptation of this type of the rear roof module has a further advantageous effect on an inexpensive construction of the vehicle roof for the motor vehicle. Moreover, the modular roof which can be configured contributes to an increased rigidity of the vehicle roof, since the second roof module without a steel frame can be coupled directly to the vehicle body of the motor vehicle.

According to an embodiment of the method, the coupling of the first roof module to the second roof module comprises adhesive bonding of the first roof module to the foamed edge of the second roof module. In the case of adhesive bonding of this type, an adhesive bead is applied on the rear section of the frame element and/or the foamed front edge of the rear roof module, for example, and the two roof modules are oriented relative to one another and are connected to one another. Here, the one or more adhesive beads extend along the rear edge of the frame element or along the front foamed edge of the rear roof module and possibly also laterally along the associated longitudinal sides of the frame element or the second roof module.

In accordance with a further embodiment of the method, the coupling of the first roof module to the second roof module comprises screwing of the first roof module to the second roof module. Screwing of the two roof modules to one another can take place in addition to the above-described adhesive bonding and can be carried out, for example, in the region of the front foamed portion. At predefined positions, for example, the foamed portion has threaded inlets which have also been made in the foamed portion during the foaming process, in order to make an additional screwed connection of the roof modules possible and to contribute to a reliable and stable construction of the modular roof.

To the front or circumferential foamed portion, the second roof module possibly has a further foamed portion which is configured in a manner which is spaced apart from the foamed portion which is configured on the edge of the second roof module, and makes a screw connection of the two roof modules possible. Moreover, in order to reinforce the rear roof module, transverse struts or reinforcing elements can be used which can be positioned in a variable manner and can be produced in a material-saving and inexpensive manner. Reinforcing elements of this type can contribute to stable and secure coupling both of the two roof modules to one another and of the modular roof to a vehicle body of the motor vehicle.

According to a further embodiment, the method comprises coupling of a guide rail to the first and/or the second roof module for guiding a roof element which can be moved relative to the second roof module. By means of said development, the modular roof which can be configured is augmented by one or more guide rails which are attached to an underside of the front and/or rear roof module on both sides, for example, in relation to the vehicle longitudinal axis of a motor vehicle which is ready for operation. Here, the respective underside denotes that side of the roof modules which faces the vehicle interior or the passenger compartment in an operationally ready state of the vehicle roof and the motor vehicle.

For example, the guide rails make opening, displacing and closing of the roof element of the first roof module possible. As an alternative or in addition, the guide rails can be configured for operating a shade apparatus and for guiding a blind or a sunroof liner which make optional shading of the vehicle interior possible. In particular, in each case one common guide rail can be coupled on both sides to the front and/or rear roof module, in order to make guiding of a movable roof element as far as into the region of the respective other roof module possible. Therefore, for example, a movement of the roof element of the front roof module over the rear roof module can be made possible, or shading of the underside of the front roof module starting from a vehicle rear close to a rear edge of the rear roof module can be made possible.

In accordance with a further embodiment, the method comprises coupling of the modular roof to a vehicle body of the motor vehicle, and configuring of the vehicle roof as a result. Said embodiment specifies the method in such a way that the above-described modular roof is coupled as a prefabricated structural unit to a provided vehicle body of the motor vehicle in a further step, and configures a vehicle roof of the motor vehicle as a result.

In accordance with a further embodiment of the method, the coupling of the modular roof to the vehicle body of the vehicle roof comprises adhesive bonding of the modular roof to the vehicle body of the vehicle roof. In accordance with the above-described adhesive bonding of the two roof modules to one another, adhesive bonding of this type can take place by means of a further adhesive bead which is applied as a separate adhesive bead over the full circumference to the vehicle body of the motor vehicle and/or an underside of the modular roof. For example, the adhesive bead which couples the two roof modules to one another is arranged on an upper side of the frame element, and the further adhesive bead which couples the modular roof to the vehicle body is arranged on an underside of the frame element. In relation to a vertical cross section along the longitudinal axis of the modular roof, the adhesive beads are configured or arranged such that they are spaced apart from one another between the front and the rear roof module at least in the region of the coupling interface. In particular, the modular roof can be realized as a prefabricated structural unit, with the result that the adhesive beads which are described are configured after one another temporally and configure completely separate adhesive beads from one another.

A modular roof according to the invention for a vehicle roof for a motor vehicle comprises a first roof module with a frame element and a roof element which is coupled to the frame element such that it can be moved relative to the frame element, in order for it to be possible, for example, for an opening in the vehicle roof to be selectively opened and closed. Furthermore, the modular roof comprises a frameless second roof module which is separate from the first roof module and, on an edge, has a predefined foamed portion, by means of which the second roof module is coupled to a rear (in relation to a longitudinal axis of the modular roof) section of the frame element of the first roof module.

The modular roof for a vehicle roof can be produced, in particular, by means of one of the above-described methods, with the result that all the features and properties of the method for producing a vehicle roof are also disclosed for the modular roof as well and vice versa.

In accordance with an embodiment of the modular roof, in the rear section, the frame element of the first roof module has two projecting regions, by means of which the first roof module is coupled to the second roof module. In accordance with a further embodiment of the modular roof, the first roof module is adhesively bonded to the foamed edge of the second roof module by means of the rear section of the frame element.

The frame element of the first front roof module and the foamed portion on the front edge of the rear roof module are usefully adapted to one another in such a way that a stable and reliable coupling of the two roof modules to one another can be configured. The projecting regions realize extended sections on the rear edge of the frame element, in order, in particular, to make an enlarged coupling interface between the two roof modules to be coupled possible, and therefore to make a contribution to a secure and stable construction of the modular roof.

A vehicle roof according to the invention comprises a modular roof in accordance with one of the above-described configurations, which modular roof is coupled to a vehicle body of a motor vehicle by means of adhesive bonding. Accordingly, all the features and properties of the above-described modular roof and method are also disclosed for the vehicle roof.

Exemplary embodiments of the invention are described in greater detail in the following text using the diagrammatic drawings, in which:

BRIEF DESCRIPTIONS OF THE DRAWING

Figure 2:
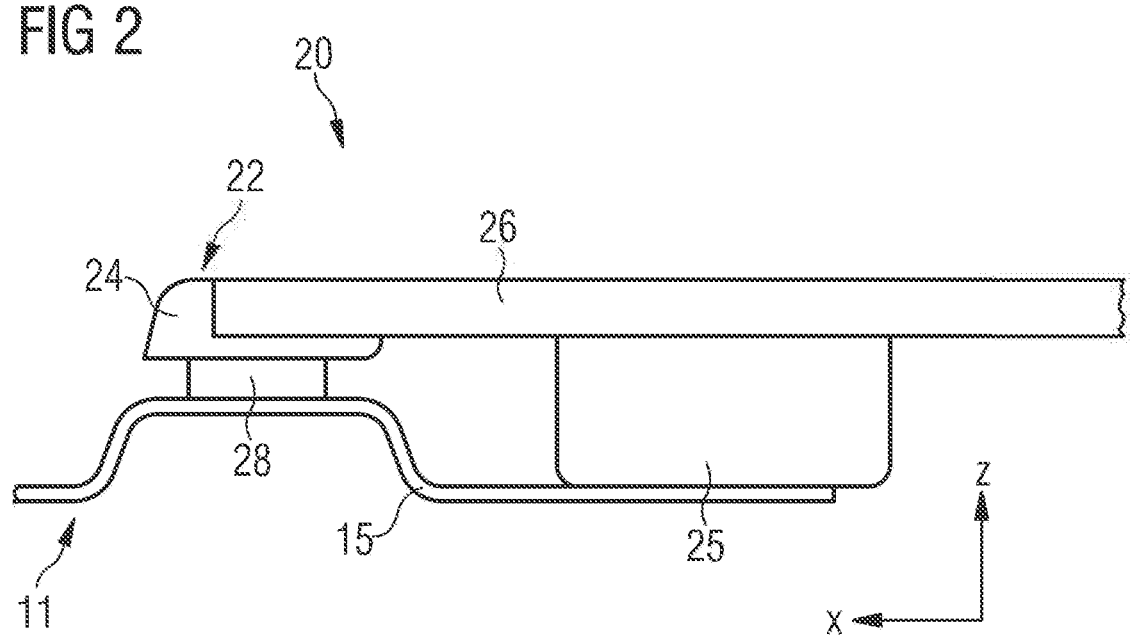
Figure 3:
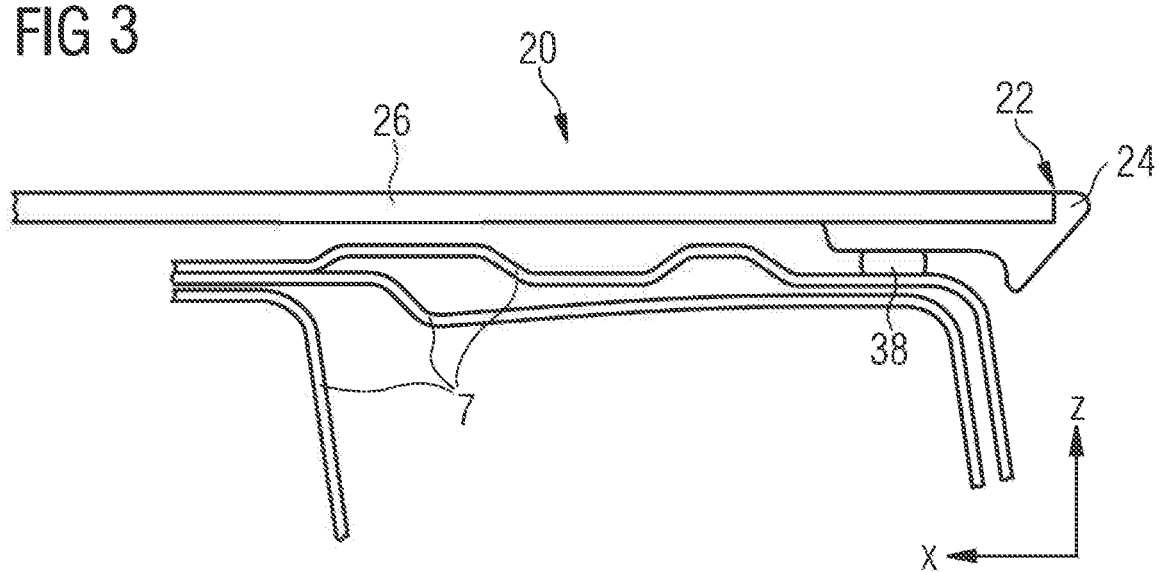
Figure 5:
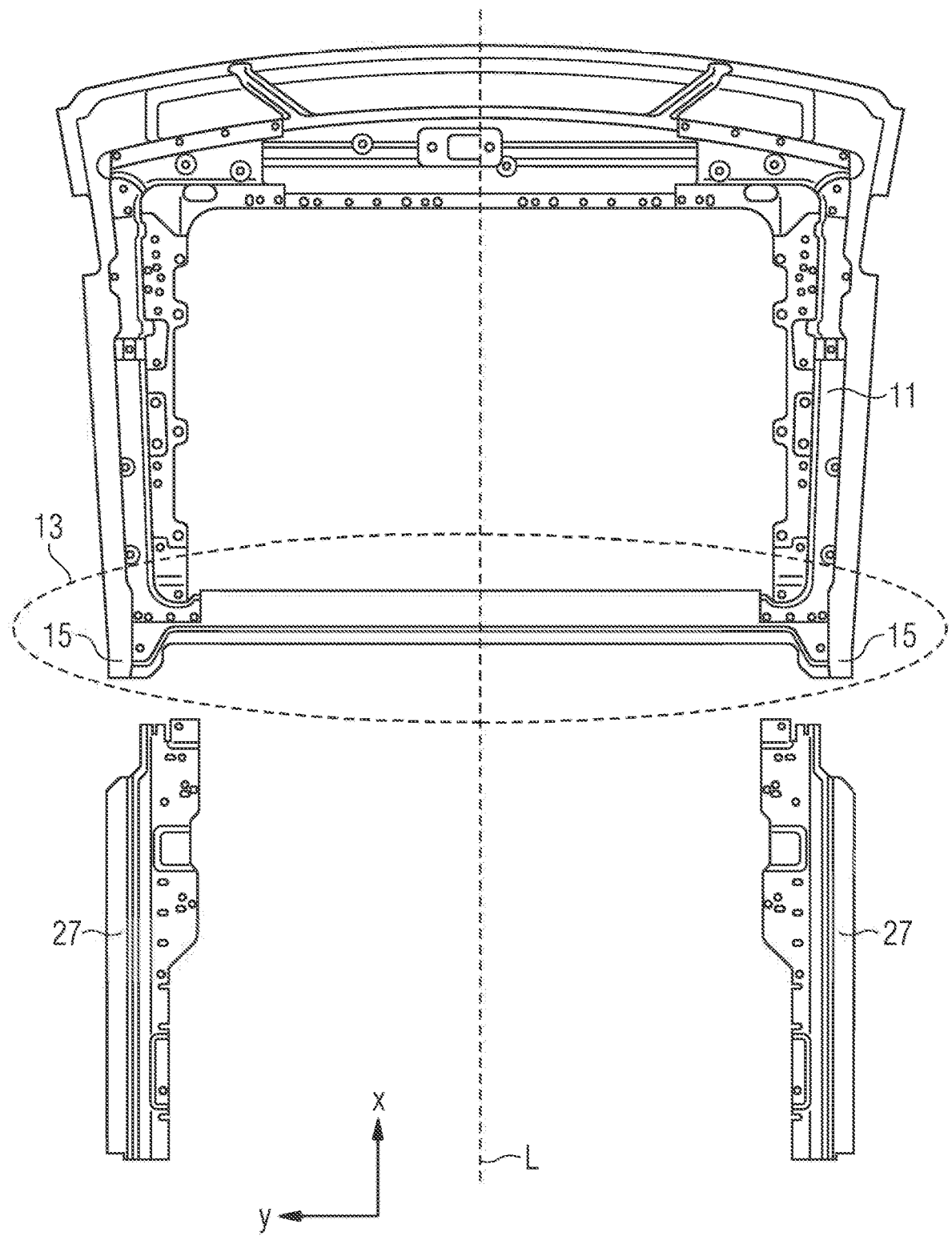
Figure 6A:
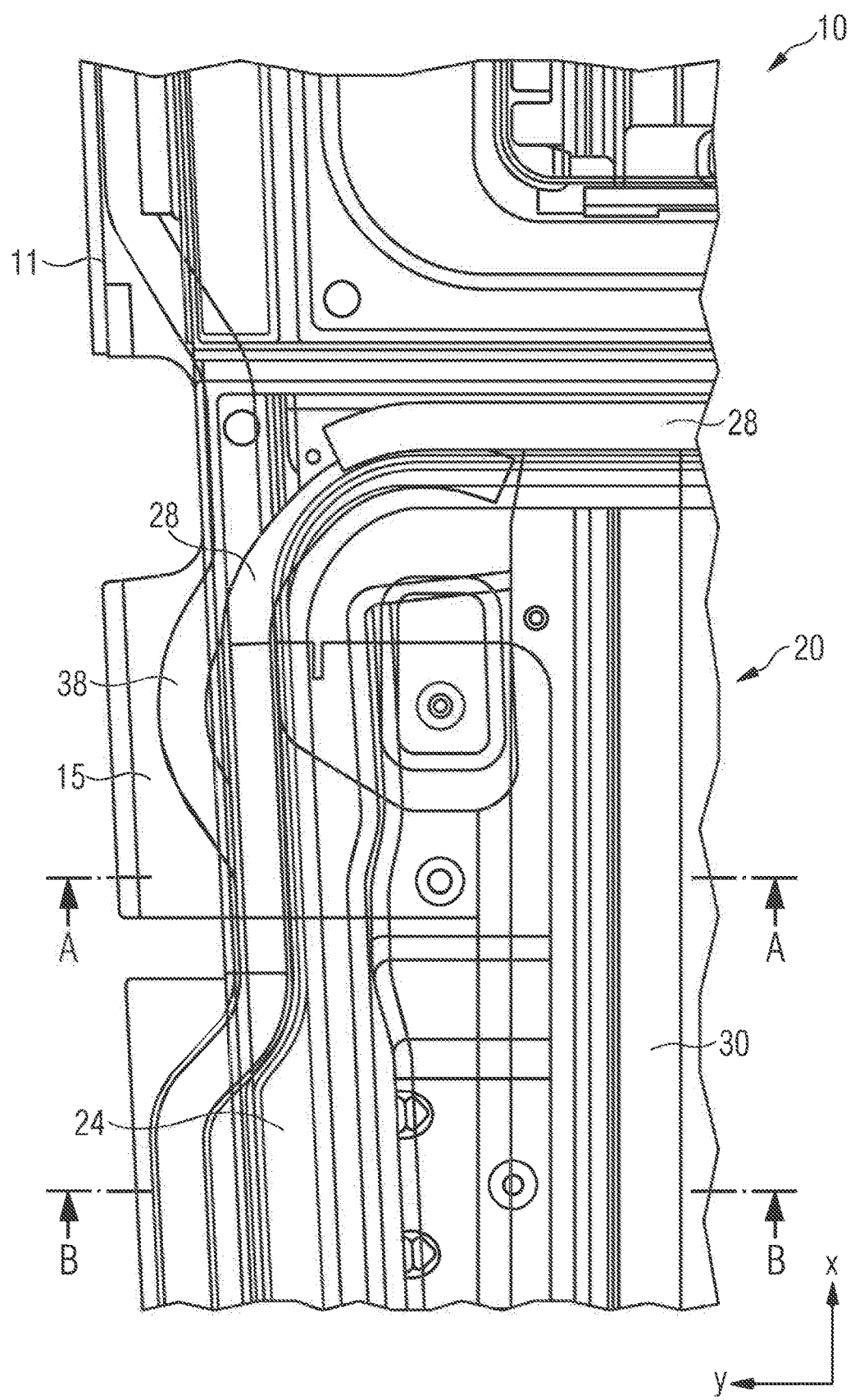
Figure 6B:
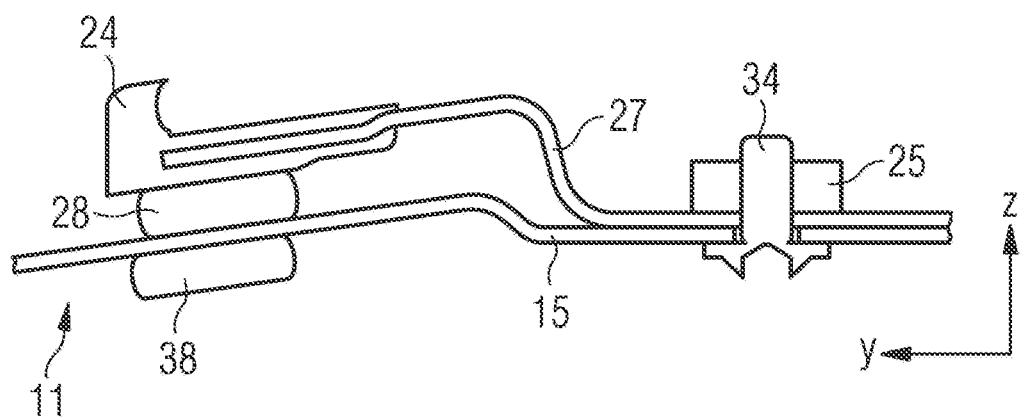
Figure 6C:
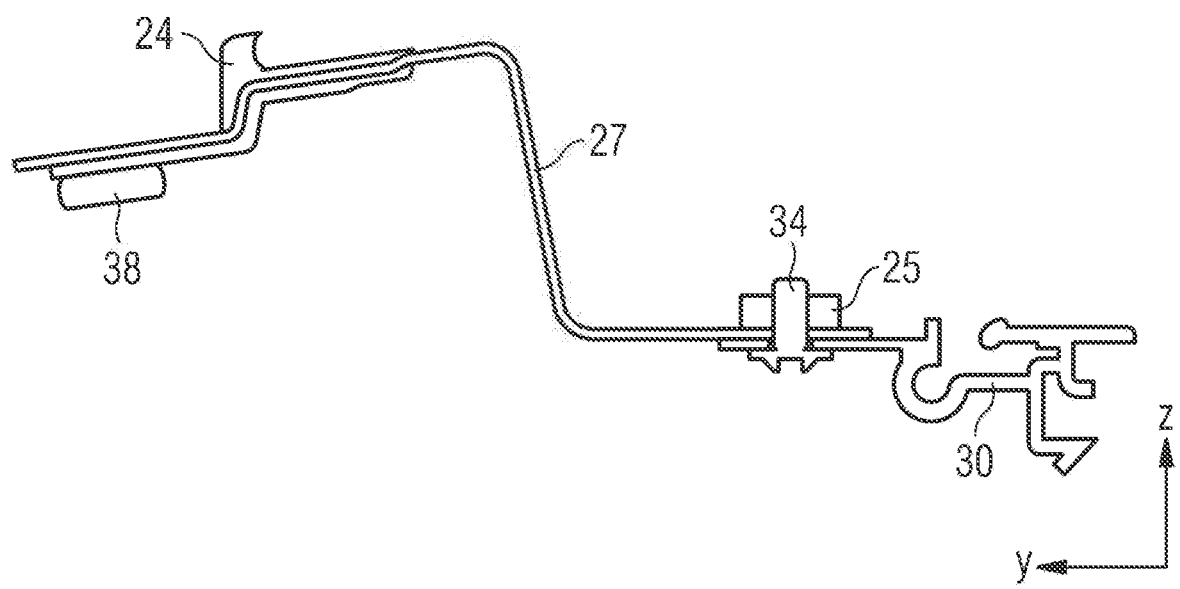
Figure 7:
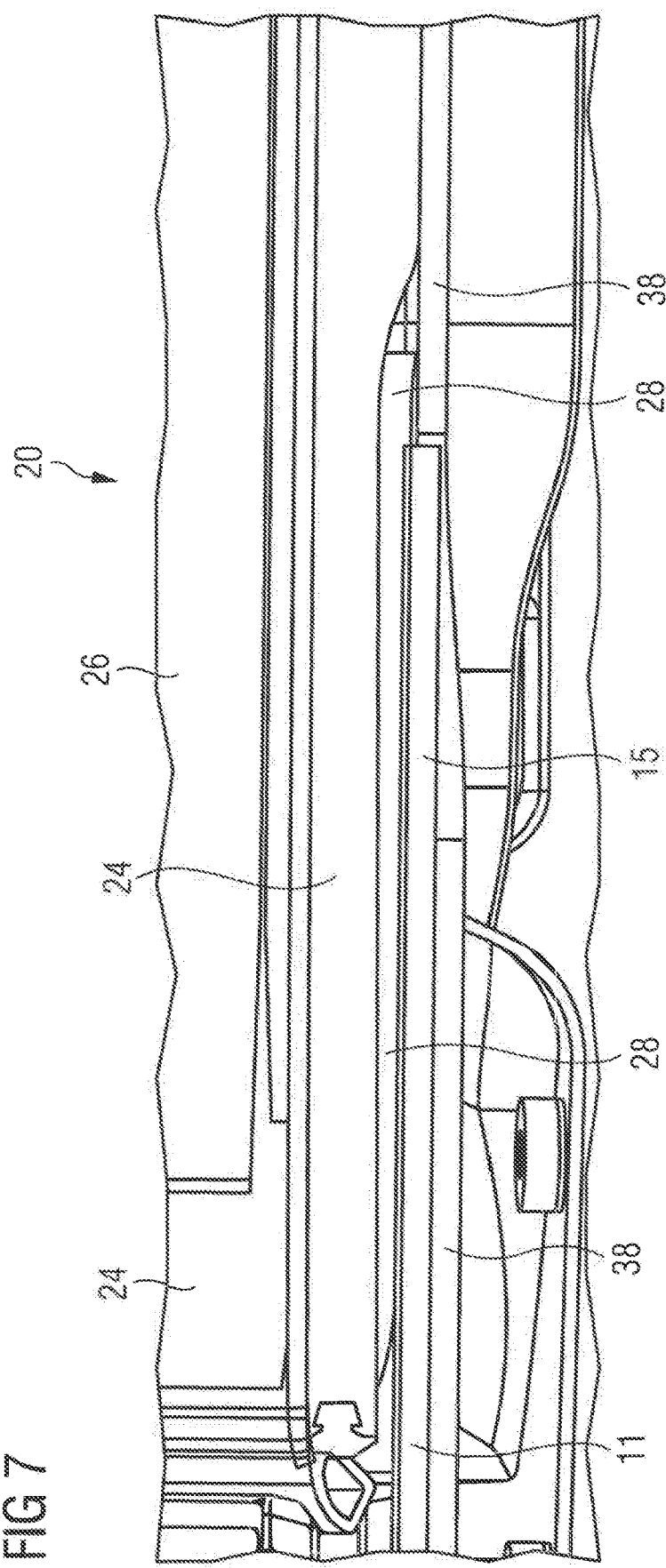

FIG. 1 shows a vehicle roof in a perspective view,
FIG. 2 shows one exemplary embodiment of a coupling of a first roof module to a second roof module,
FIG. 3 shows one exemplary embodiment of a coupling of the second roof module to a vehicle body of a motor vehicle,
FIGS. 4A-4B show one exemplary embodiment of a modular roof for the vehicle roof of a motor vehicle,
FIG. 5 shows one exemplary embodiment of components for the first and second roof module,
FIGS. 6A-6C show a further exemplary embodiment of a coupling of the first and second roof module in various views, and
FIG. 7 shows a further exemplary embodiment of a coupling of the first and second roof module in a perspective view.

DETAILED DESCRIPTION

Elements of identical construction or function are labeled with the same reference sign universally in the figures. For reasons of clarity, not all the elements which are shown are possibly labeled by corresponding reference signs in all the figures.

FIG. 1 diagrammatically shows a perspective view of a motor vehicle 1 with a vehicle roof 3 which has a first roof module 10 and a second roof module 20. In relation to a longitudinal axis L and a customary driving direction of the operationally ready motor vehicle 1, the first roof module 10 can also be called a front roof module and the second roof module 20 can also be called a rear roof module. Moreover, terms such as "top" and "bottom" and "upper side" and "underside" relate to a vertical orientation or arrangement of the respective components in accordance with the illustrated z-direction substantially perpendicularly with respect to the operationally ready vehicle roof 3.

The first roof module 10 has a frame element 11 and a roof element 12 which is coupled to the frame element 11 such that it can be moved relative to the frame element 11, in order for it to be possible for an opening 5 in the vehicle roof 3 to be selectively opened and closed. The second roof element 20 has a foamed portion 24, by means of which it is coupled to the frame element 11 of the front roof module 10. The second roof module 20 is realized, for example, as a fixed glass element with a glass cover 26, and is therefore configured such that it cannot be moved relative to the vehicle roof 3.

The front first roof module 10 and the rear second roof module 20 are coupled to one another and realize a modular roof 100 which configures the vehicle roof 3 when attached to a vehicle body 7 of the motor vehicle 1. As will be described using the following figures, the modular roof 100 and the corresponding vehicle roof 3 can be produced in a simple and time-saving way, and can additionally contribute to a considerable saving of the material and cost expenditure required during the manufacturing. Moreover, the modular roof 100 can be configured in coordination with the provided vehicle body 7 of the motor vehicle 1 in an inexpensive and low-effort way, and contributes to a space-saving construction of the vehicle roof 3, in particular on account of the coupling of the roof modules 10 and 20.

FIG. 2 illustrates a side sectional view of a coupling interface between the first roof module 10 and the second roof module 20. On a front edge 22, in particular, the second roof module 20 has the foamed portion 24, by means of which the rear roof module 20 is coupled to the front roof module 10. The foamed portion 24 is of elongate configuration in relation to the longitudinal axis L (x-direction), with the result that the second roof module 20 is connected reliably by means of an adhesive bond 28 to a rear section 13 of the frame element 11. In order to contribute further to a stable, secure and reliable coupling between the two roof modules 10 and 20, the frame element 11 has one or more projecting regions 15 in the rear region 13. The projecting region or regions 15 realizes/realize extended sections on the rear edge of the frame element 11, and configures/configure an enlarged coupling interface between the coupled roof modules 10 and 20.

The foamed portion 24 can be configured on the front edge 22 of the second roof module 20, or can be configured as a fully circumferential foamed frame on the edge 22 of the second roof module 20. A foamed frame of this type is to be distinguished from the frame element 11 of the first roof module 10 with regard to function and properties, however.

An additionally laterally configured foamed portion 24 can configure a receiving possibility for guide elements, such as guide rails 30 (cf. FIGS. 6A and 6C) and, in particular, can make an attachment of the second roof module 20 to the vehicle body 7 of the motor vehicle 1 possible.

In the exemplary embodiment which is shown in FIG. 2, moreover, the second roof module 20 has, spaced apart from the foamed portion 24, a further foamed portion 25 which makes reinforced coupling between the two roof modules 10 and 20 possible and contributes to a reliable and secure construction of the modular roof 100. At predefined positions, for example, the further foamed portion 25 has threaded inlets which were made in the foamed portion 25 during the respective foaming process, in order to make a screw connection 34 of the roof modules 10 and 20 possible in addition to the adhesive bonding 28 (cf. FIGS. 6B and 6C). As an alternative or in addition, a screw connection can also be provided in the region of the foamed portion 24.

FIG. 3 illustrates a side sectional illustration of an interface between the second roof module 20 in a region of the vehicle rear of the motor vehicle 1. The second roof module 20 is coupled directly to the vehicle body 7 of the motor vehicle 1 by means of the foamed portion 24 and by means of an adhesive bond 38, and therefore contributes to an increased rigidity of the vehicle roof 3. The foamed portion 24 is also configured in this region and is adapted to the vehicle body 7 of the motor vehicle 1 in such a way that reliable and stable coupling of the rear roof module 20 and the modular roof 100 to the vehicle body 7 by means of the adhesive bond 38 is possible. In relation to the longitudinal axis L of the vehicle roof 3 or the modular roof 100, foamed portion 24 in the illustrated cross section can be denoted as being of elongate configuration.

It can be seen using the illustration which is shown in FIG. 3 that the second roof module 20 does not have a frame element like the first roof module 10, and therefore contributes to a space-saving construction of the vehicle roof 3. The modular roof 100 and the corresponding vehicle roof 3 can be of flat configuration, in particular in relation to a depth (substantially in the vertical direction of extent in accordance with the illustrated z-direction) of the second roof module, and can therefore make an increased headroom in a passenger compartment of the motor vehicle 1 possible.

FIGS. 4A and 4B illustrate a further exemplary embodiment of the modular roof 100 in a side sectional illustration. In said exemplary embodiment, the modular roof 100 comprises a shade apparatus 32 which makes shading of the vehicle interior of the motor vehicle if desired possible, in order to reduce an entry of light through the first or second roof module 10 or 20 into the passenger compartment. For example, guide rails 30 are coupled to the first and/or second roof module 10 and/or 20 on both sides in relation to the longitudinal axis L, which guide rails 30 make a reliable operation of the shade apparatus 32 and guidance of a blind or a sunroof liner possible. With regard to one vehicle side of the motor vehicle, a guide rail 30 of this type can also be coupled as a common guide rail to the front and/or rear roof module 10 and/or 20, in order to make guidance of a movable roof element possible, such as the roof element 12 or a shading element of the shade apparatus 32, as far as into the region of the respective other roof module.

FIG. 5 shows a plan view of exemplary refinements of components of the first and second roof module 10 and 20. The frame element 11 is realized, for example, as a metallic frame, in particular a steel frame, and, in the rear section 13, has two extended projecting regions 15 which have an advantageous effect on reliable and secure coupling of the two roof modules 10 and 20 and contribute to a stable modular roof 100.

In accordance with said exemplary embodiment, the second roof module 20 comprises laterally arranged reinforcing elements 27 which can contribute to a secure and reliable attachment of the rear roof module 20 and the modular roof 100 to the vehicle body 7 of the motor vehicle 1. In addition, the reinforcing elements 27 can be coupled to the extended regions 15 of the frame element 11 by means of adhesive bonding and/or screwing, in order to configure a particularly stable modular roof 100.

FIGS. 6A to 6C show various positions of the coupling interface between the first and the second roof module 10 and 20 in various views. FIG. 6A illustrates a plan view of the first roof module 10 which is coupled to the second roof module 20 in the rear section 13 of the frame element 11 by means of the adhesive bond 28. Moreover, the modular roof 100 is coupled to the vehicle body 7 of the motor vehicle 1 by means of a separate adhesive bond 38. Moreover, FIG. 6A illustrates a guide rail 30 which, for example, makes guidance of a shading element in accordance with FIGS. 4A and 4B possible.

FIG. 6B illustrates a diagrammatic sectional illustration along the line AA which is shown in a dashed manner in FIG. 6A. In accordance with said exemplary embodiment, the reinforcing elements 27 are surrounded by the foamed portion 24 on an edge and are connected to the frame element 11 by means of the adhesive bond 28. The projecting regions 15 of the frame element 11 are additionally screwed to the reinforcing elements 27. A screw connection 34 of this type can be configured, for example, in or through the further foamed portion 25.

It can be seen using FIG. 6B that the adhesive bond 28 which couples the two roof modules 10 and 20 to one another is arranged on an upper side of the frame element 11, and the further adhesive bond 38 which couples the modular roof 100 to the vehicle body 7 is arranged on an underside of the frame element 11, and said adhesive bonds 28, 38 are configured as adhesive beads which are separate from one another. In relation to a vertical perpendicularly with respect to the longitudinal axis L of the modular roof 100, the adhesive beads are configured or arranged such that they are spaced apart from one another at least in the region of the coupling interface between the front and the rear roof module 10 and 20.

FIG. 6C shows a diagrammatic sectional illustration along the line BB which is shown in a dashed manner in FIG. 6A. It can be seen using said illustration that the foamed portion 24 is configured in a predefined manner in a position-dependent way in order, in particular, to make advantageous coupling of the two roof modules 10 and 20 to one another and attachment of the modular roof 100 to the vehicle body 7 of the motor vehicle 1 possible. Moreover, a coupling of the guide rails 30 on the second roof module 20 of the reinforcing element 27 by means of the screw connection 34 is illustrated.

FIG. 7 diagrammatically illustrates a further, perspective view of the region of the coupling interface between the first and the second roof module 10 and 20. The foamed portion 24 is configured both on the front edge 22 and on the side edges 22 of the glass cover 26. In relation to the longitudinal axis L of the modular roof 100, the foamed portion 24 is connected directly to the vehicle body 7 of the motor vehicle 1 by means of the adhesive bond 38 in a manner which is of deeper configuration in a rear region of the second roof module 20. The foamed portion is of narrower configuration in the region of the extended sections 15 of the frame element 11, in order to configure a flush and esthetically pleasing final result of the manufactured modular roof 100, in particular in a manner which is adapted to a shape of the front roof module 10. Here, there is a certain clearance at one end of the projecting regions 15, into which clearance the adhesive bond 28 between the first and the second roof module 10 and 20 extends. There is a certain amount of play in said region, and the foamed portion 24 is adapted in the direction of the vehicle rear to an attachment to the vehicle body 7 of the motor vehicle 1.

The invention claimed is:

1. A method for producing a vehicle roof for a motor vehicle, comprising:
   providing of a first roof module with a frame element and a roof element which is coupled to the frame element in such a way that the roof element is movable relative to the frame element,
   providing of a frameless second roof module which is separate from the first roof module,
   foaming of an edge of the second roof module at a predefined position, and coupling of a rear (in relation to a longitudinal axis (L) of the vehicle roof) section of the frame element of the first roof module to the foamed edge of the second roof module, and thereby
   configuring of a modular roof to laterally spaced reinforcement elements, each supporting a guide rail and each coupled to the frame element.

2. The method according to claim 1, in which the coupling of the first roof module to the second roof module comprises: adhesive bonding of the first roof module to the foamed edge of the second roof module.

3. The method according to claim 1, in which the coupling of the first roof module to the second roof module comprises: screwing of the first roof module to the second roof module.

4. The method according to claim 1, wherein the guide rails are capable of supporting a shading element.

5. The method according to claim 1, further comprising: coupling of the modular roof to a vehicle body of the motor vehicle, and thereby configuring of the vehicle roof.

6. The method according to claim 5, in which the coupling of the modular roof to the vehicle body of the motor vehicle comprises: adhesive bonding of the modular roof to the vehicle body of the motor vehicle.

7. A modular roof for a vehicle roof for a motor vehicle, comprising:
   a first roof module with a frame element and a roof element which is coupled to the frame element and is configured such that it can be moved relative to the frame element, and
   a frameless second roof module which is separate from the first roof module and, on an edge, has a predefined foamed portion, by means of which the second roof module is coupled to a rear in relation to a longitudinal axis (L) of the modular roof section of the frame element of the first roof module, wherein laterally spaced reinforcement elements, each support a guide rail and each are coupled to the frame element.

8. The modular roof according to claim 7, in which the first roof module is adhesively bonded to the foamed edge of the second roof module by the rear section of the frame element.

9. The modular roof according to claim 7, in which, in the rear section, the frame element has two projecting regions, by which the first roof module is coupled to the second roof module.

10. A vehicle roof, comprising a modular roof according to claim 7 which is coupled to a vehicle body of a motor vehicle by adhesive bonding.

* * * * *